United States Patent
Anglin et al.

(10) Patent No.: US 8,054,962 B2
(45) Date of Patent: Nov. 8, 2011

(54) CALL PROCESSING BASED ON CALL PATTERNS AND OTHER CRITERIA

(75) Inventors: Howard N. Anglin, Austin, TX (US); Frank A. Nuzzi, Austin, TX (US); Charles V. Rankin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 641 days.

(21) Appl. No.: 12/241,760

(22) Filed: Sep. 30, 2008

(65) Prior Publication Data
US 2010/0080366 A1    Apr. 1, 2010

(51) Int. Cl.
*H04M 3/42* (2006.01)
*H04B 1/38* (2006.01)

(52) U.S. Cl. .................... 379/211.02; 455/574
(58) Field of Classification Search ............. 379/211.02; 455/574
See application file for complete search history.

(56) References Cited

U.S. PATENT DOCUMENTS

| | | | |
|---|---|---|---|
| 5,467,388 A | 11/1995 | Redd et al. | |
| 6,064,874 A | 5/2000 | Cox et al. | |
| 6,507,646 B1 | 1/2003 | Fishler | |
| 6,731,732 B2 | 5/2004 | Creamer et al. | |
| 2002/0151293 A1 | 10/2002 | Tysor | |
| 2005/0181838 A1* | 8/2005 | Matsuda et al. | 455/567 |
| 2011/0069826 A1* | 3/2011 | Adams et al. | 379/211.02 |

FOREIGN PATENT DOCUMENTS

| | | |
|---|---|---|
| DE | 10242913 | 3/2004 |
| JP | 403147449 | 6/1991 |
| JP | 406224988 | 8/1994 |
| JP | 406284176 | 10/1994 |
| JP | 2002320264 | 10/2002 |
| KR | 20070050116 | 5/2007 |
| KR | 20070070735 | 7/2007 |

* cited by examiner

*Primary Examiner* — Davetta W Goins
*Assistant Examiner* — Mohammad Islam
(74) *Attorney, Agent, or Firm* — DeLizio Gilliam, PLLC (57) ABSTRACT

The patent application describes techniques for managing calls. In one embodiment, a computer-implemented method comprises detecting a call to a target phone; determining a source of the call; determining one or more patterns of talk time for calls between the source and the target phone, wherein the patterns indicate one or more call durations for the calls between the source and the target phone; determining an amount of talk time a battery in the target phone can sustain; determining that at least one of the call durations for the calls between the source and target phone is greater than the amount of talk time the battery in the target phone can sustain; and sending the call to a voice mail associated with the target phone.

14 Claims, 6 Drawing Sheets

CALL PROCESSING BASED ON CALL PATTERNS AND OTHER CRITERIA

BACKGROUND

Embodiments of the inventive subject matter generally relate to the field of phone calls, and, more particularly, to techniques for managing incoming phone calls.

Modern phones are typically equipped with a display that alerts the phone user of the identity of the caller (caller ID). The caller ID displays the caller's name and/or their phone number when they call. When the phone rings the user must look at the phone's display in order to determine who is calling. The user may then decide to answer the phone or let the phone go to voice mail.

SUMMARY

A computer-implemented method comprising detecting a call to a target phone is disclosed. The method includes determining a source of the call. The method further includes determining one or more patterns of talk time for calls between the source and the target phone. The patterns indicate one or more call durations for the calls between the source and the target phone. The method further includes determining an amount of talk time a battery in the target phone can sustain. The method further includes determining that at least one of the call durations for the calls between the source and the target phone is greater than the amount of talk time the battery in the target phone can sustain. The method further includes sending the call to a voice mail associated with the target phone.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, the embodiments may be practiced without these specific details. For instance, although examples refer to the management of phone calls to cell phones, the call management system may manage calls to any communication device, such as a land based phone. In other instances, well-known instruction instances, protocols, structures and techniques have not been shown in detail in order not to obfuscate the description.

Embodiments described herein comprise a system and method for call management. In some embodiments, the call management system allows a user of a target phone to set up and/or automatically activate call criteria for the target phone. The call criteria may be associated with any criteria, phone attribute, and/or event regarding the target phone, a service provider and/or a user. For example, the call criteria may relate to remaining battery life for the target phone. The call management unit can collect information regarding past use of the target phone. The call management unit can use this information to determine call patterns for different callers of the target phone. For example, the call management unit may determine an average talk time between the target phone and a caller. The call management system may compare the call pattern (e.g., talk time) with the call criteria (e.g., battery life) to determine a call status for the phone call. If the call pattern does not interfere with the call criteria, the call status may be to complete the phone call to the target phone. If the call pattern interferes with the call criteria (e.g., if the average talk time is longer than the remaining battery life on the target phone), the call management system takes an alternative action, such as sending the call directly to voice mail in some embodiments.

In some embodiments, the call management system may prevent a user from exceeding call time in a service plan associated with the target phone. In some embodiments, the call management system may determine the time left on the target phone's service plan and the typical call time between the target phone and the caller. For example, if there are one hundred minutes left on the target phone's service plan and the target phone is typically connected with the source caller for five minutes, the call management system may complete the phone call. If the caller is typically connected for over one hundred minutes, the call management system may employ an alternative action, such as sending the call to voice mail, alerting the user and/or the caller of the interference between the call pattern and the call criteria. In some instances, the call management system may complete a phone call even if the call criteria interfere with the call pattern. For example, the call management system may override the criteria and pattern in an emergency situation (e.g., caller indicates a medical emergency).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer or phone, partly on the user's computer or phone, as a stand-alone software package, partly on the user's computer, or phone, and partly on a remote computer or entirely on the remote computer or server. In the latter scenario, the remote computer may be connected to the user's computer, or phone, through any type of network, including a local area network (LAN), a personal area network (PAN), or a wide area network (WAN), or the connection may be made to an external computer (for example, through the Internet using an Internet Service Provider).

Figure 1:
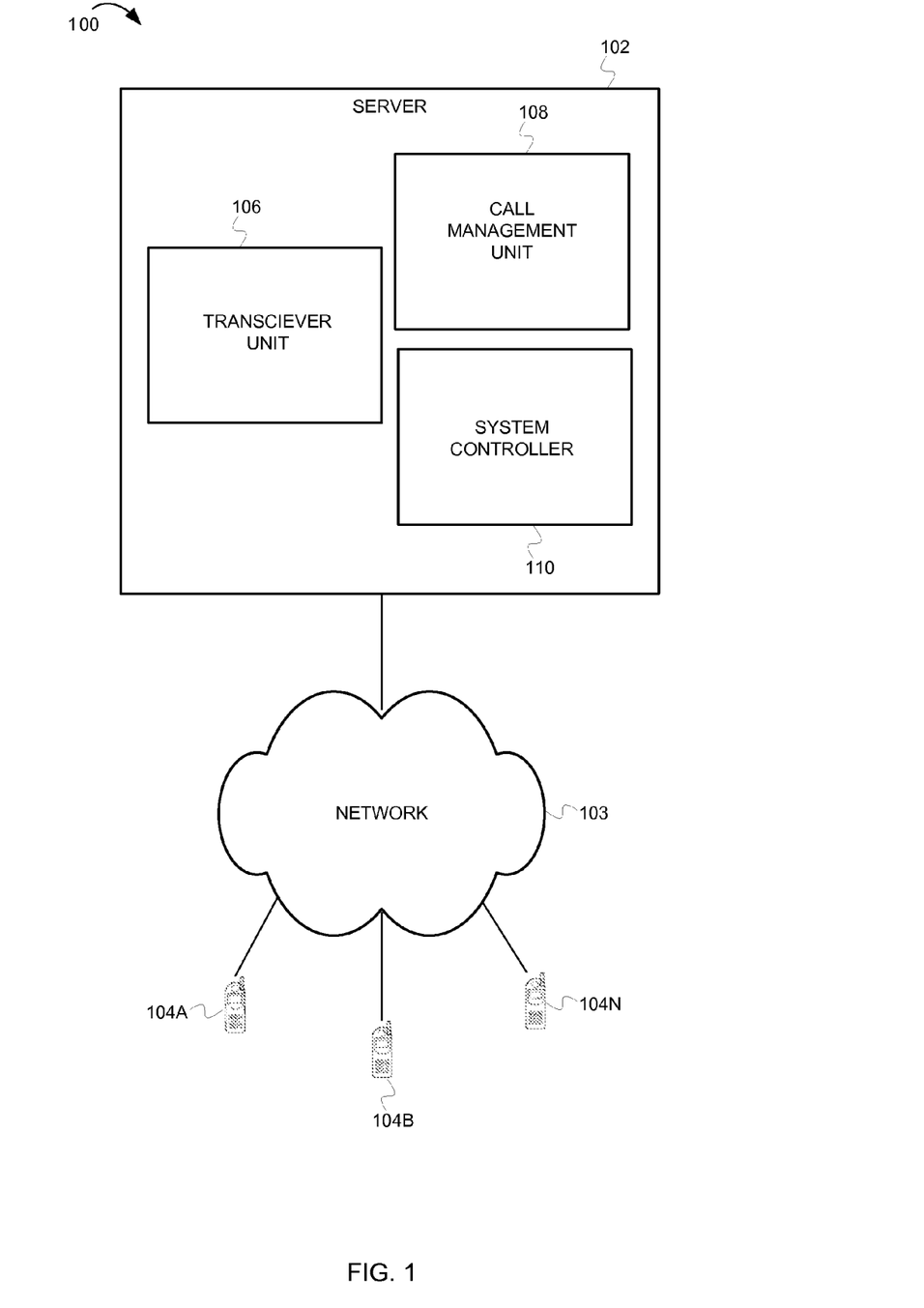
FIG. 1 depicts a block diagram illustrating a call management system configured to compare a call pattern between the source of the call and the target phone with a call criteria of a target phone in an embodiment of the invention.

FIG. 1 depicts a block diagram illustrating a system 100 configured to manage phone calls based on call patterns and call criteria for one or more phones, according to some embodiments of the invention. As shown, the system 100 includes a call server 102, a communication network 103, and one or more phones 104A-N. The call server 102 includes a transceiver unit 106, a call management unit 108 and a system controller 110. The communication network 103 allows for communication between the call server 102 and the one or more phones 104A-N. The one or more phones 104A-N may be any communication device capable of sending and receiving messages including but not limited to a cell phone, a mobile phone, a satellite phone, a smart phone, a personal digital assistant (PDA), landline telephones, and the like. The transceiver unit 106 allows the call server 102 to send and receive data between one or more phones 104A-N. The phones 104A-N can send and receive any data including but not limited to voice calls, text messages, emails, and any other information.

The system controller 110 can manage the data sent between the phones 104A-N. The system controller 110 may also control various features used by the service provider for the phones 104 A-N including but not limited to call routing, determining service plan minutes, billing, and the like.

Figure 2:
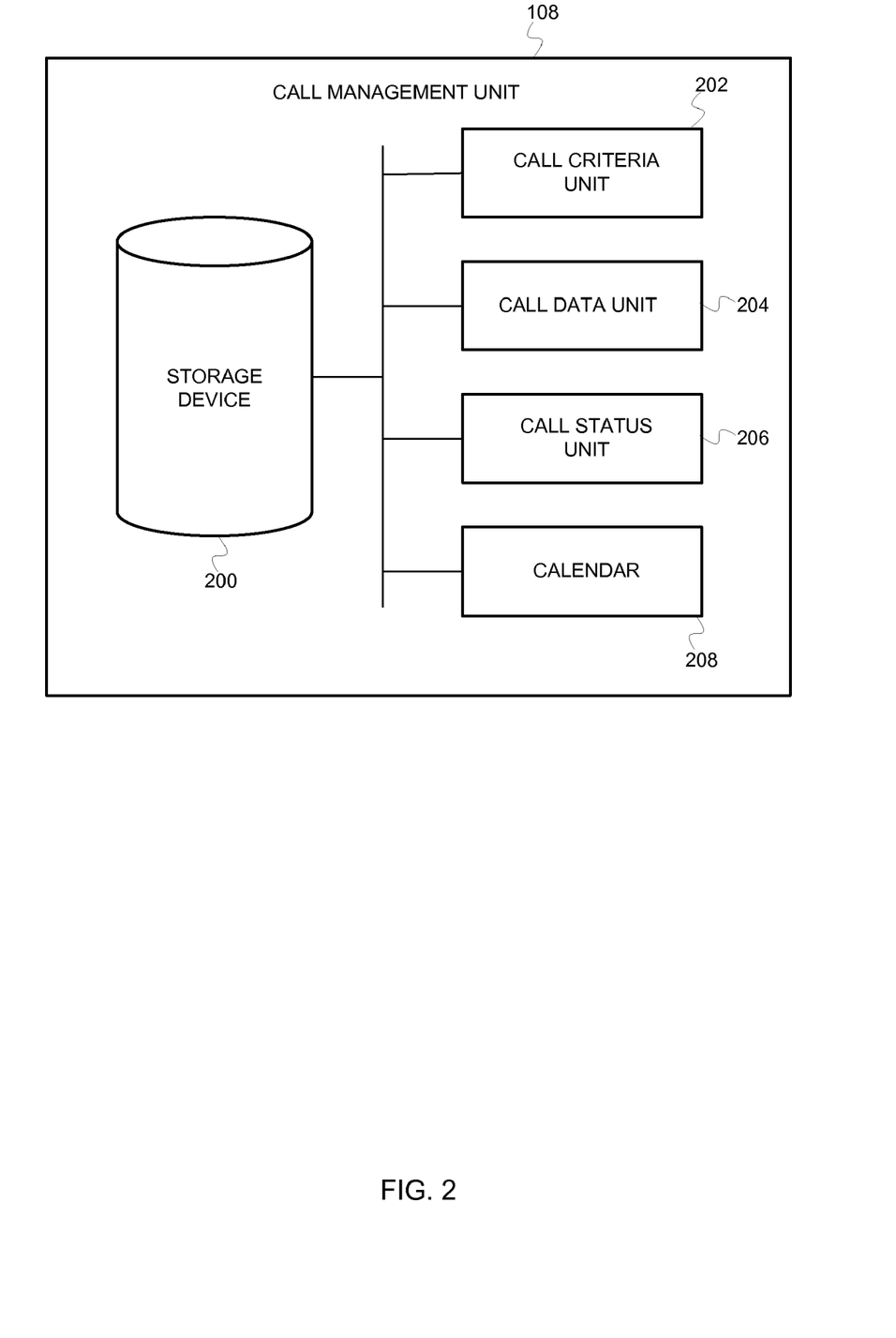
FIG. 2 depicts a block diagram illustrating a call management unit in an embodiment of the invention.

FIG. 2 depicts the call management unit 108 according to some embodiments of the invention. The call management unit 108 may include a storage device 200, a call criteria unit 202, a call data unit 204, a call status unit 206 and a calendar 208. The storage device 200 may store any suitable information relating to the call management unit 108 including, but not limited to, the call criteria, the call patterns, data about the phones, the call status, and any scheduling and/or calendar information. The call management unit 108 allows a user of a phone to manage one or more incoming calls from other phones. The call management unit 108 may determine call patterns between the target phone and the source phone. The call management unit 108 may compare the call patterns with the call criteria and then determines a call status for the call.

The call criteria unit 202 determines one or more call criteria which are used for managing incoming phone calls to the target phone. The call criteria may be associated with the target phone, the service provider, and/or the user. The call criteria can include a phone attribute, a calendar event, an environmental condition, a server requirement, a service provider attribute, and the like. The phone attribute may, for example, be the battery life of the phone, the battery life of a head set, the battery life of a Bluetooth unit, the minutes left on the phone plan, the number of incoming phone calls, and the like. The calendar event may be any calendar event in which the user or other individual or group may be involved (e.g., an upcoming meeting, a gathering, an appointment, a dinner and the like). The environmental condition may be any suitable external condition that the target phone may be experiencing now or in the future including, but not limited to, a service dead spot, a tunnel, a weather event, and the like. The call criteria unit 202 may automatically determine each of these criteria as they relate to the target phone. Further, the user may select only the call criteria that are important to the user. Thus, the call criteria may be selected by the user of the target phone, the service provider, the target phone, the call server, and/or any combination thereof.

The call data unit 204 may determine call patterns between a target phone and any number of callers. The call data unit 204 may store a history of phone calls between the target phone and other phones. The call data unit 204 may determine a pattern between the target phone and other phones. For example, the call data unit 204 may simply average the call time between a particular calling phone and the target phone in order to determine the call pattern. The call data unit 204 may keep a complete history of all phone calls in order to determine the call patterns.

The call status unit 206 may compare the call pattern with the call criteria in order to determine a call status for a call between the target phone and another phone. When the call pattern does not interfere with the target phones call criteria, the call status indicate that the call should be completed. The user of the target phone may then receive the phone call on the target phone and decide whether or not to answer the target phone. When the call status unit 206 determines that a phone call has the interfering status, the call status unit 206 may take an alternative action for the phone call rather than completing the phone call to the target phone. For example, the alternative action may be sending the phone call directly to voice mail, sending a message to the user, sending a message to the source caller, alerting the service provider, determining if an overriding factor exists, and the like.

The calendar 208 may be any calendar or scheduling application capable of storing and scheduling events. The calendar 208 may be a schedule of events, meetings, social engagements, etc. that the user of the target phone may attend. The calendar events may be used to determine the call criteria. For example, the call management system may prohibit an incoming call from interfering with a calendar event. Thus, the call criteria unit 202 may access the calendar 208 when establishing the one or more call criteria for the target phone.

Figure 3:
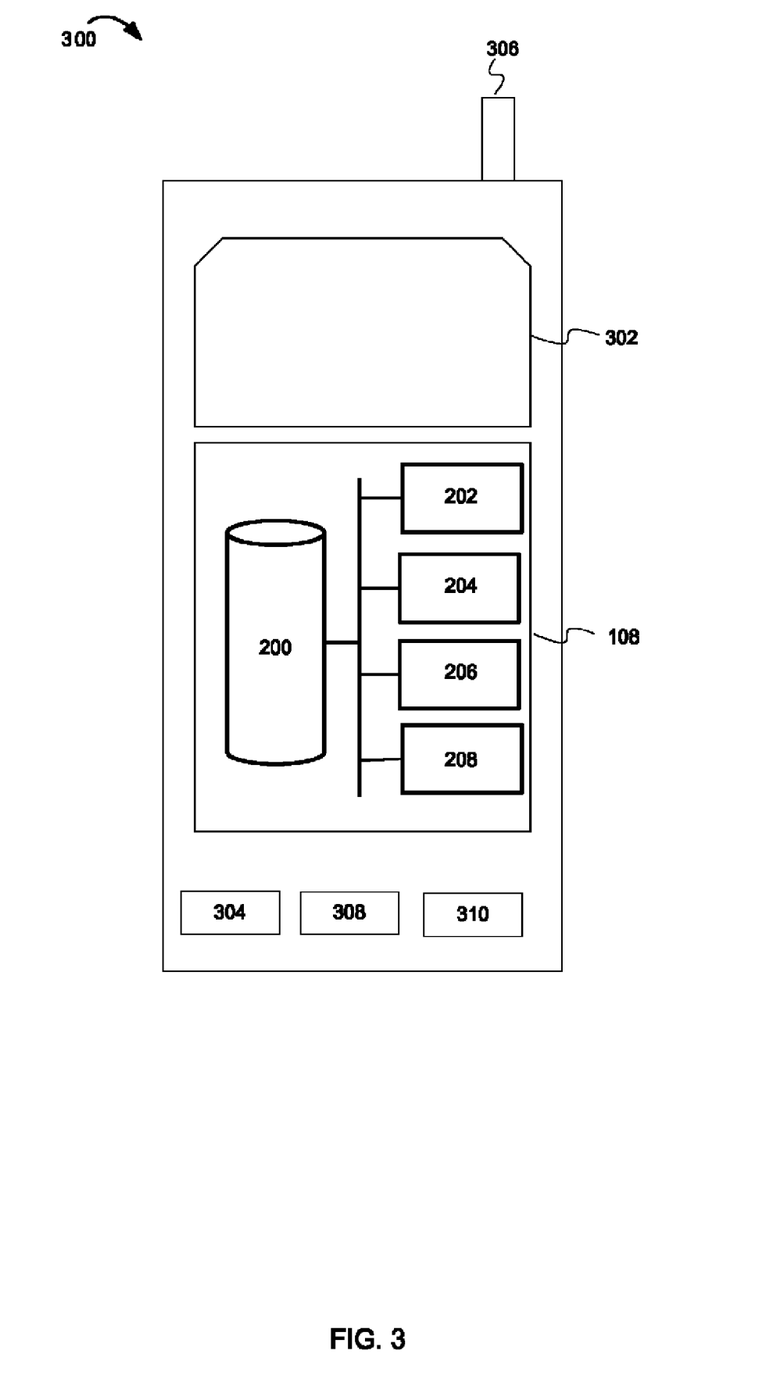
FIG. 3 depicts a block diagram illustrating a phone in an embodiment of the invention.

FIG. 3 depicts a block diagram of a phone 300 according to some embodiments. The phone 300 may include a display 302, a battery 304, an antenna 306, a transceiver unit 308, and a GPS unit 310. The display 302 may alert the user of any number of attributes of the phone 300 including, but not limited to, the remaining battery life, the source of an incoming call, calendar information, minutes left on service plan, time and date, and the like. The transceiver unit 308 allows the phone 300 to send and receive information. The phone 300 may further include the call management unit 108. The call management unit 308 on the phone 300 may be an extension of the call management unit 108 on the call server 102, or may be a separate entity. Thus, any of the phones 104A-N may be equipped with the call management unit 308 including a call criteria unit 302, call data unit 304, call status unit 306, and calendar 308. Therefore, the call management system may be executed entirely on the call server, entirely on the phone 300, or any combination thereof.

The GPS unit 310 of the target phone may send information to the call server 102 to determine the location of the target phone. The call server 102 may receive the location of the target phone in regular intervals and determine a travel speed of the target phone and the projected direction of the phone. The call server may be able to determine upcoming dead spots the target phone may encounter based on the travel speed and direction including, but not limited to, a tunnel, a location out of area, a location experiencing a disturbing weather pattern, and the like.

Figure 4:
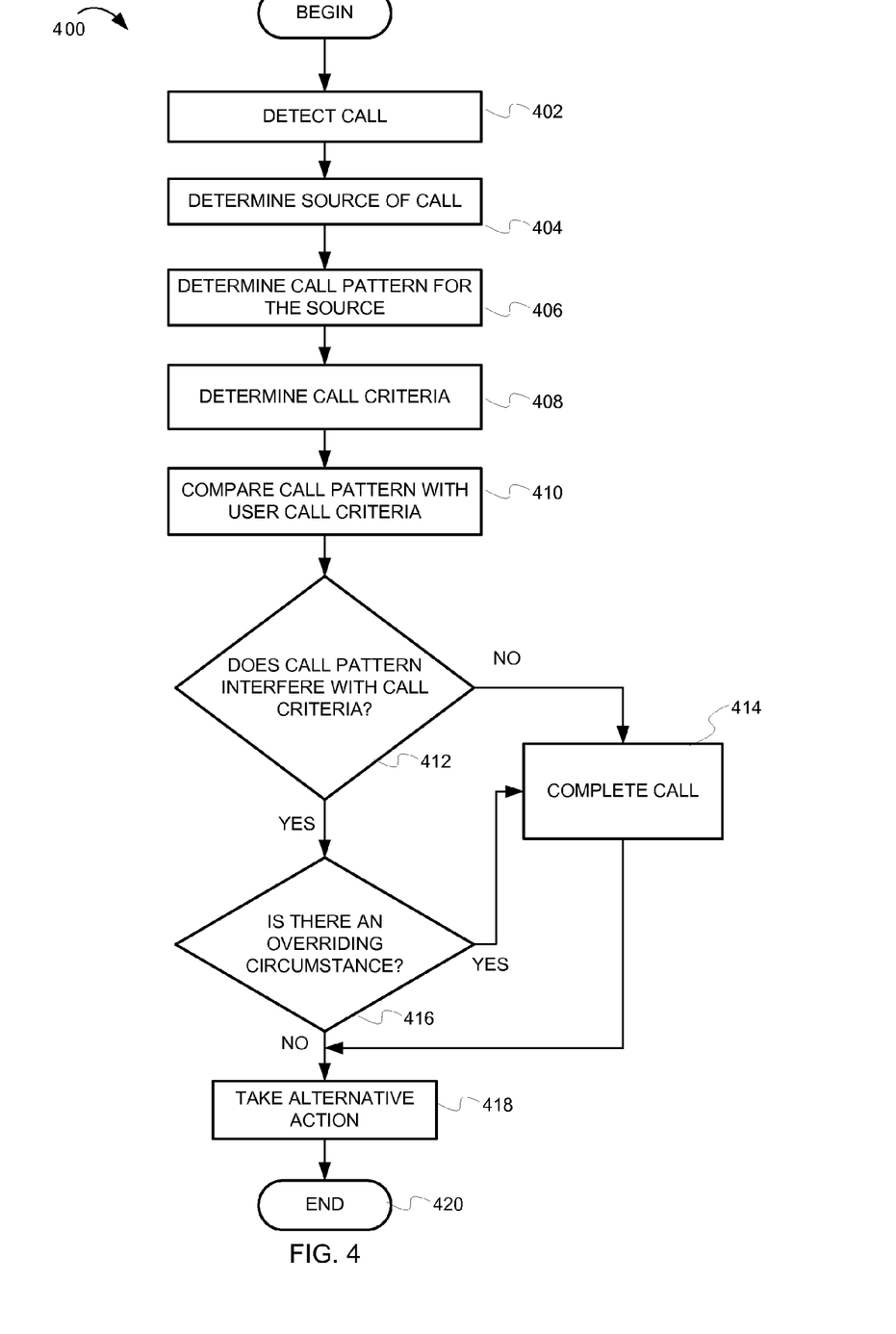
FIG. 4 depicts a flowchart illustrating the operation of the call management unit in an embodiment of the invention.

FIG. 4 depicts a flow diagram illustrating the operations of the call management unit 108, according to some embodiments of the invention. The flow 400 begins at block 402, where a call is detected. The call server 102 may detect a phone call from a source phone directed to a target phone. The source phone can be any phone (including phones 104A-N), and the target phones can be any of the phones 104A-N.

The flow continues at block 404, where the source of the call is determined. That is, the call server 102 determines a phone, phone number, or other suitable identifier associated with the call to the target phone.

The flow continues at block 406 where a call pattern between the source phone and the target phone is determined. The call pattern may be determined by the call data unit 204, as shown in FIG. 2. The call pattern may be determined by compiling a history of talk time between the source phone and the target phone. Thus, the call data unit can store length of time for each call between the source phone and the target phone. The call data unit may then calculate an average talk time by dividing the total time of the phone calls by the total number of calls. The call pattern may then be the average talk time of the total number of calls between the source phone and the target phone in some embodiments of the invention. The call data unit 204 can use any suitable call statistics, such as longest call, shortest call, etc.

In another example, the call pattern may be determined by taking times & dates into account in addition to the history of talk time between the source phone and the target phone. The call pattern between the source phone and the target phone may vary depending on the time of day or the day of the week of the calls. For example, if the user's mother calls during work hours, the call may typically last less than five minutes. However, if the user's mother calls on Sunday the call may typically last an hour. Thus, the call data unit may use the history of talk time between the source phone and the target phone for a particular time during the week to determine the call pattern, according to some embodiments.

In yet another example, the call pattern may be determined exclusively based on the time during the week, month, or year. For example, the user of the target phone may end all calls in less than five minutes during a particular time of day, for example in the morning during a commute. Thus, the call pattern may be the average talk time of the user during a particular time of day according to some embodiments. Further, any number of methods for determining the call pattern may be used, or any combination of methods described herein.

The flow continues at block 408, where the one or more call criteria are determined. The one or more call criteria may be established by the call criteria unit 202. The call criteria may be selected by the user, the service provider, the target phone and/or any number of environmental conditions surrounding the target phone. The call criteria may be any suitable criteria which may influence the incoming phone call between the source phone and the target phone. The call criteria can include a phone attribute, a service provider condition, a current event, an upcoming event, an environmental condition and the like. The call criteria may be automatically activated by the call criteria unit 202. Further, the user may enable any call criteria from a list of presented by the call criteria unit 202.

The call criteria may be a time limit for incoming phone calls, in some embodiments of the invention. This feature may allow the user of the target phone to save time during a busy work day. For example, the user may decide that they do not want to talk to anyone who has an average talk time greater than a specified talk time (e.g., ten minutes). Thus, the user can selects a call criteria indicating a ten minute talk time. The call criteria unit 202 may then store the call criteria, which indicates the user's specified talk time.

In some embodiments, the call criteria may indicate a remaining battery life (e.g., talk time the battery can sustain) for the battery 304 in the target phone. The user, the service provider, and/or the call management unit 108 may select remaining battery life to be at least one of the call criteria. In some embodiments, when the battery discharges below a specified level, level the call criteria unit 202 may automatically select remaining battery life as the call criteria. For example, the call criteria unit 202 may select one of the call criteria to be the battery life when the remaining battery life is below an hour of talk time. The target phone may monitor battery life remaining and send this information to the call criteria unit 202 during the life cycle of the battery.

The call criteria may indicate the remaining battery life of a hands free head set (i.e., talk time the head set's battery can sustain) used in conjunction with the target phone, in some embodiments of the invention. The user, the service provider, and/or the call management unit 108 may select this feature as at least one of the call criteria. For example, when headset's battery life can sustain no more than a specified talk time, the call criteria unit 202 may automatically select the head set's remaining battery life as the call criteria. Further, the user may select the call criteria as the remaining battery life of the headset. The call criteria may additionally be a combination of the remaining battery life of the target phone and the headset. Further, if the user, the target phone, and/or the service provider determines that the user is exclusively using the headset, the call criteria may exclusively be the remaining battery life of the headset. For example, if the user is driving a car, the call management unit may detect, through the GPS unit 310, that the target phone is travelling at a high speed and therefore most likely in the car. The target phone may detect the use of the hands free set in conjunction with the likelihood that the user is traveling in a car. Due to the user's exclusive use of the headset, the call management unit 108 may only require the battery life of the headset to be monitored. Thus, the call criteria unit 202 may then automatically select the remaining battery life of the headset exclusively as the call criteria.

The call criteria may be based on a calendar event in some embodiments of the invention. The call criteria unit 202 may receive and/or access information from the user's calendar 208. The call criteria unit 202 may then base the call criteria on the time remaining until a calendar event occurs. The call criteria unit 202 may automatically select a call criteria based on the calendar event when the calendar event is imminent or occurring. For example, the user may have a work meeting in 30 minutes. The meeting may be scheduled for one hour. The call criteria unit 202 may detect the meeting and send the call to voicemail for the time remaining before the meeting. The call criteria unit 202 may additionally indicate that the call should be sent to voicemail during the meeting. The user may select certain events from a weekly schedule to include in the calendar 208 for use by the call criteria unit 202. For example, a work meeting may be critical to include as the call criteria, wherein an event such as a dinner may not be critical to include in the call criteria. Further, the user may wish to include all calendar events in the call criteria.

The call criteria may be based on a time of day in some embodiments of the invention. The user may select a certain time of day in which call time should be limited. For example, the user may select his drive time commute, or meal times to limit call times. The user may then select a specific time of day and a call time limit for the time of day. Thus the call criteria may indicate a time limit set by the user during a specific time during the week. For example, during the six o'clock p.m. hour of the day, when the user typically eats dinner with their family, the user may select call criteria that limits calls to callers with whom average talk time is less than two minutes.

The call criteria may be based on the service plan minutes remaining, in some embodiments of the invention. The user of the target phone may have a specific number of minutes remaining on the service plan before the minutes are exceeded. If the user exceeds the minutes, the fee on the phone calls may increase substantially. Therefore, the call criteria unit 202 may be set to monitor the remaining minutes left on the service plan. The call criteria unit 202 may automatically select the call criteria based on the remaining service plan minutes when the plan minutes drop below a critical number of minutes, for example one hundred minutes. Then, the call criteria unit 202 may select call criteria that corresponds with the amount of minutes left on the service plan. Further, the call criteria unit 202 may select call criteria that is shorter than the remaining minutes left. For example, the call criteria unit 202 may recognize that there are only one hundred minutes left on the service plan and there are seven days remaining until minutes renew. In this example, the call criteria may be set to a low value such as five minutes in an effort to minimize the risk that the user exceeds the service plan minutes in the next seven days.

The call criteria may be based on the time remaining before encountering an environmental condition in some embodiments of the invention. For example, the call criteria unit 202 may determine that the target phone will be in a dead zone within a fixed amount of time. The call criteria unit 202 may then establish the call criteria based on this fixed amount of time. The fixed amount of time before experiencing the dead spot may be selected as the criteria.

The call criteria may be automatically selected by the call criteria unit 202, the user, the service provider or any combination thereof. Further, the call criteria may be any combination of the call criteria described herein depending on the situation surrounding the target phone and the user. The call management unit may automatically select the call criteria based on the situation surrounding the target phone. Further, the user may enable and/or disable any call criteria which the user feels are important.

The flow continues at block 410 where the call pattern is compared with the call criteria. The call pattern may be compared with the call criteria in the call status unit 206 to determine the call status of the detected call. The call status unit 206 may compare the call pattern with the call criteria using any method. For example, the call status unit 206 may compare a time identified in the call pattern with a time of the call criteria. If the time of the call pattern is greater than the time of the call criteria, the call status is that of an interfering call. If the time of the call pattern is less than the time of the call criteria, the call status can indicate that the phone call does not interfere. It should be appreciated that the call status unit 206 may consider a call pattern time that is close, but not larger, than the call criteria time as an interfering call status.

The call status unit 206 may compare the call pattern with any number of call criteria. For example, the call pattern may be compared with one of the call criteria, such as the battery life of the target phone, in some embodiments of the invention. In another example, the call status unit 206 may compare multiple call criteria with the call pattern, such as the battery life of the target phone, the minutes remaining on the service plan, and calendar events. The call status unit 206 can compare any number of call criteria with the call pattern.

The call status unit 206 may compare the call pattern with the call criteria to determine the call status of the phone call. For example, if the call pattern, for the phone call between the source phone and the target phone, is greater than the one or more call criteria then the call status may be that the call interferes with the call criteria. In this case, the call status may be to take an alternative action. If the call pattern does not interfere with the one or more call criteria then the call status may be to transmit the call to the target phone, in some embodiments.

The flow continues at block 412, where the call status unit 206 determines if the call pattern interferes with the call criteria. If the call pattern does not interfere with the one or more call criteria the flow continues at block 414, where the call is transmitted to the target phone (i.e., the call is completed).

If the call pattern does interfere with the one or more call criteria, the flow may continue at block 416, where it is determined whether there is an overriding circumstance. There may be occasions where even though the call pattern of the incoming call interferes with one or more of the call criteria, the user wants the call completed anyway. The user, the target phone, and/or the service provider may select one or more overriding circumstances in which the phone call is to be completed even if the call pattern interferes with the one or more call criteria. If there is an overriding circumstance then the flow continues at block 414 wherein the call is transmitted to the target phone.

The overriding circumstance may be user defined, in some embodiments of the invention. For example, the user may select an overriding circumstance to allow any call from a specified source caller regardless of the call pattern between the source phone and the target phone and the call criteria. Further, the user may specify a specific amount of time to allow the source caller to talk with the user. For example, the user may select the overriding circumstance to allow the call between the specified source caller, but to limit the amount of time for the call. Thus, the call would be completed, but the call management unit 108 may alert the user, and/or the emergency call source of a time limit for the call.

In yet another example, the user may want to allow all calls regardless of the call pattern and the call criteria. In this example the user may simply override all interfering calls and allow the call management unit 108 to complete the call. The user may accomplish this by overriding all interfering calls, or by disabling the call management unit 108. This feature may be useful if there is a disaster occurring, or upcoming. For example, if a hurricane is approaching the location of the user, the user may wish to accept all phone calls regardless of the call patterns and the call criteria.

In another example, the service provider may wish to override call criteria that may result in the call being characterized as interfering. For example, the service provider may be trying to reach the user to discuss a phone bill, or service plan options. The service provider may select to override the call status and complete the call, so the service provider can discuss the service plan regardless of the call criteria.

If there is no overriding circumstance, the flow continues at block 418 where an alternative action is taken. The alternative action may be any action taken by the call management unit 108 other than simply completing the phone call. The alternative action may be to send the interfering phone call directly to the voice mail box of the target phone, in some embodiments of the invention. The voice mail box may include the recorded message that all missed callers hear for the target phone.

The alternative action may be to send the call to voice mail and include a recorded message relating to the reason the call was sent to voice mail, in some embodiments of the invention. For example, the phone call may have been sent to voice mail because the call pattern between the source phone and the target phone is typically ten minutes and the user has the call criteria of five minutes until a scheduled calendar event such as a work meeting is to occur. The source caller may hear a message regarding the meeting. The message may include information regarding duration of the event, the upcoming time until the event occurs, events scheduled for the rest of the day, and the like. Further, the message may include information regarding any of the call criteria.

In another example, the alternative action may be to alert the user of the target phone of the interfering call. For example, when the call management unit 108 detects an interfering phone call, the call management unit 108 may alert the user of the type of interference between the call pattern and the call criteria. Further, the user may be alerted of the identity of the source caller. The user may then decide whether to accept the call let the call go to another of the alternative actions, such as rolling to voice mail. For example, the user may receive the alert then view the display that relays that the call pattern is typically thirty minutes and the call criteria is that the user has a meeting in ten minutes. The user may then decide to accept the phone call even though the call pattern is typically longer than the call criteria. The user may decide to end the phone call prior to the phone the attribute, event, and/or environmental condition related to the call criteria occurring. The alert may be any method of alerting the user of the interference including, but not limited to, allowing the phone to ring, allowing the phone to vibrate, a visual alarm, an audio alarm, and the like.

In yet another example not shown in the flow 400, the alternative action may occur during the phone conversation between the user of the target phone and the source phone caller. For example, there may have been no interference between the call pattern and the call criteria when the call was made; however, an interference may arise during the course of the phone call. For example, if the user boarded a train during the phone call and is now approaching a tunnel. The call management unit 108 may alert the user and/or the source caller of the approaching interference due to the tunnel. Thus, due to changes in conditions surrounding the target phone, the call criteria of the target phone has changed during the phone call. The management unit 108 may then alert the user and/or the source caller of the interference that has arisen between the call criteria and the call pattern. The alert may take the form of any alert to the user and/or the source caller. For example, an audio message may be sent to one or both of the parties or any other alert described herein. After the alternative action is taken the flow ends at block 420.

Figure 5:
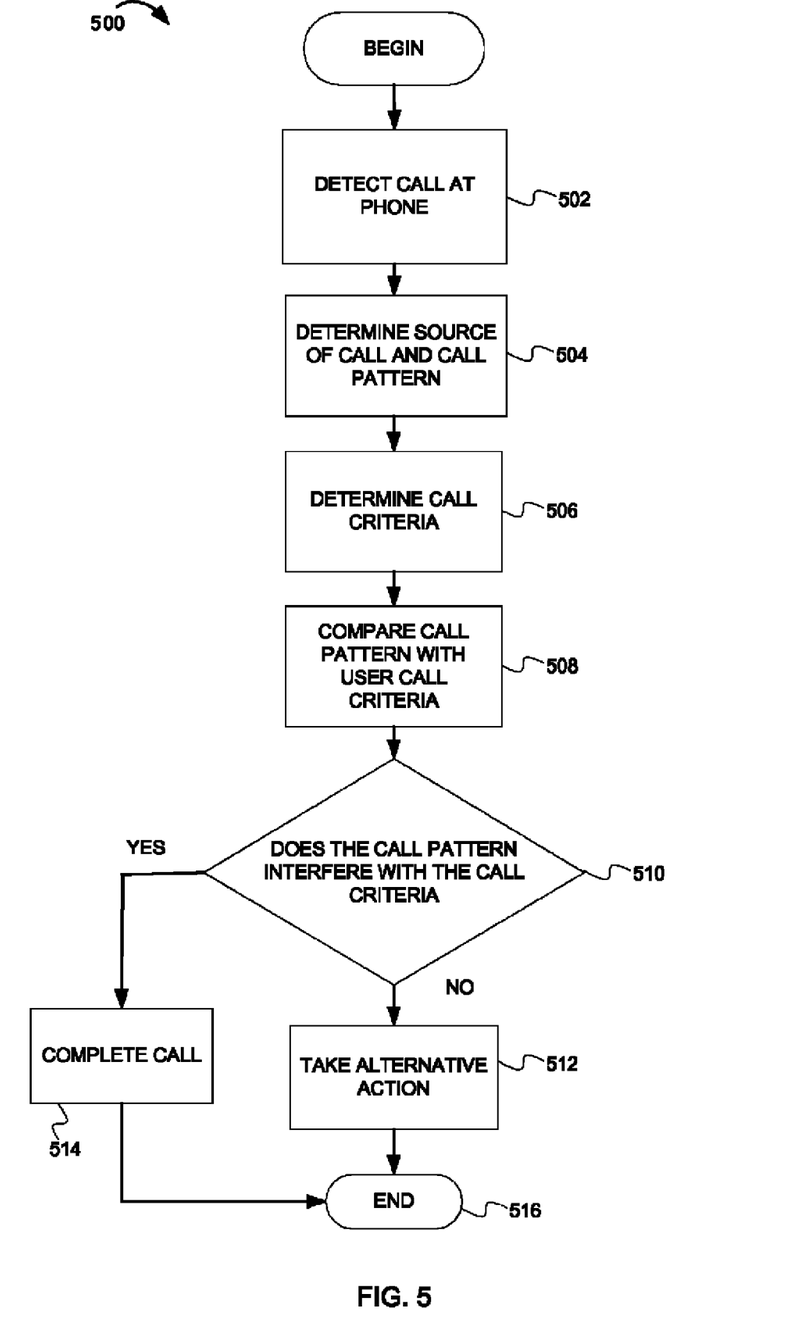
FIG. 5 depicts a flowchart illustrating the operation of the call management unit in an embodiment of the invention.

While FIG. 4 describes call processing operations of the call server, FIG. 5 describes how phones can detect and process calls.

FIG. 5 depicts a flow diagram illustrating the operations of the call management unit 108, according to some embodiments of the invention. The flow 500 begins at block 502, where a call is detected at the target phone. The target phone may be phone 300 in some embodiments of the invention. The call is made from the source phone and sent via the call server through the network 103 to the phone 300.

The flow continues at block 504 where the call data unit determines the source of the call and the call pattern. The source of the call and the call pattern may be determined by any method including the methods described herein. The flow continues at block 506 where the call criteria are determined. The call criteria may be any call criteria, or combination of call criteria, including any of the call criteria described herein. In one example, the call criteria unit 202 located on the phone 300 determines the remaining battery life in the battery 304. The call criteria unit 202 may monitor the battery life and base the call criteria on the remaining battery life of the battery 304.

The flow continues at block 508 wherein the call pattern is compared with the call criteria to determine the call status. The call status unit 206 on the phone 300 determines the call status in the same manner as described above. The flow continues at block 510 where it is determined if the call pattern interferes with the call criteria. If the call pattern does not interfere with the call criteria the flow continues at block 512 where the call is completed. If the call does interfere with the call criteria the flow continues at block 514 where an alternative action is taken for the call. The alternative action may be any suitable alternative action including any of the alternative actions described herein. After the alternative action is taken the flow ends at block 516.

Figure 6:
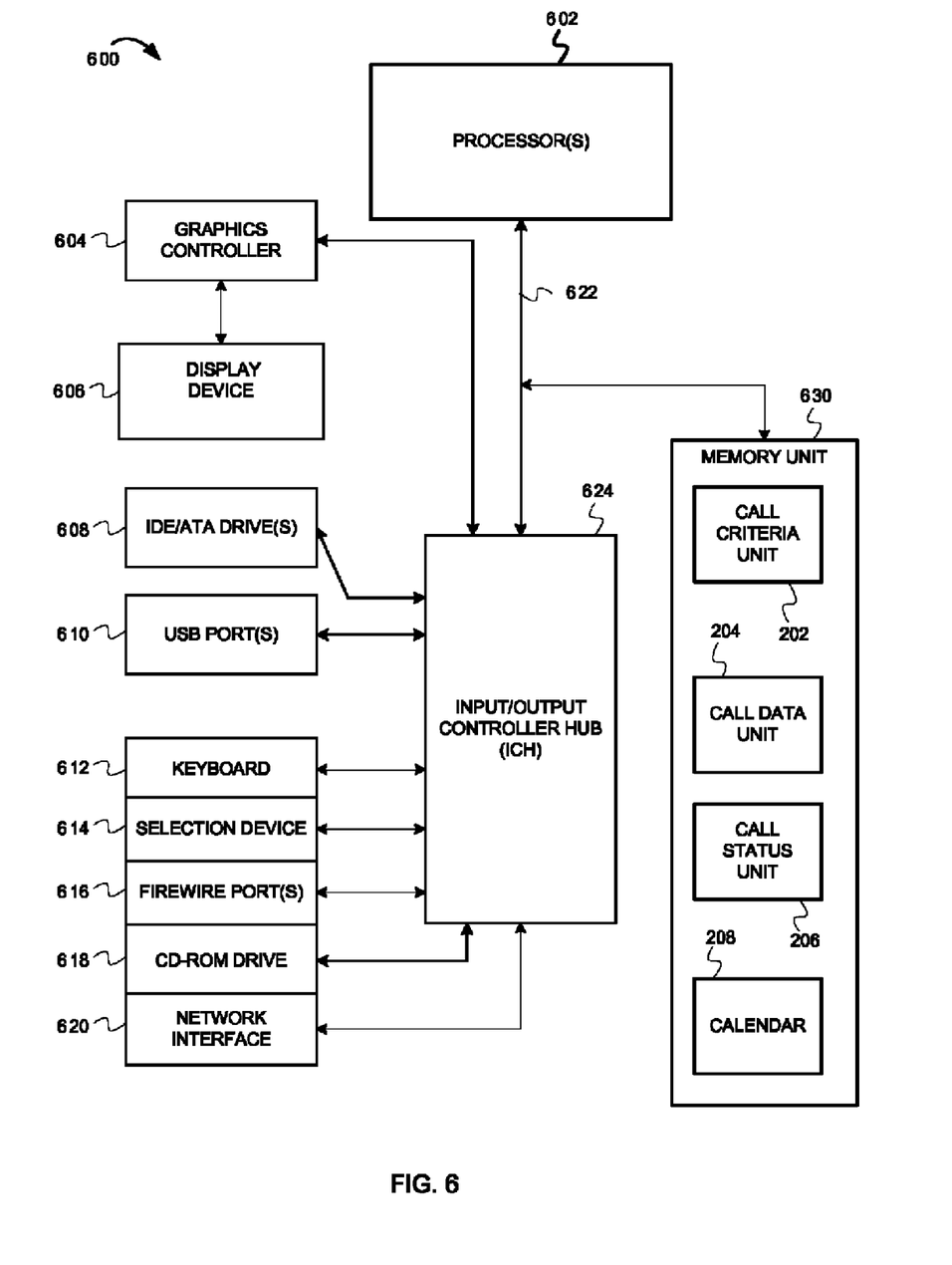
FIG. 6 depicts a schematic diagram of a computer system in an embodiment of the invention.

FIG. 6 depicts an example computer system. A computer system includes a processor unit 602 (possibly including multiple processors, multiple cores, multiple nodes, and/or implementing multi-threading, etc.). The computer system includes memory 630. The memory 630 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 624 (e.g., PCI, ISA, PCI-Express, HyperTransport®, InfiniBand®, NuBus, etc.), a network interface 620 (e.g., an ATM interface, an Ethernet interface, a Frame Relay interface, SONET interface, wireless interface, etc.), and a storage device(s) 618 (e.g., optical storage, magnetic storage, etc.). The system memory 630 embodies functionality to implement embodiments described above. The system memory 630 may include one or more functionalities that facilitate the call management system managing incoming phone calls to the target phone. To this end, the memory unit 630 may include the call criteria unit 202, the call data unit 204, the call status unit 206 and the calendar 208, each of which operate as described above. Some or all of the functionality of the call criteria unit 202, the call data unit 204, the call status unit 206 and the calendar 208 may be implemented with code embodied in the memory and/or processor, co-processor, other cards, and the like. Any one of these functionalities may be partially (or entirely) implemented in hardware and/or on the processing unit 602. For example, the functionality may be implemented with an application specific integrated circuit, in logic implemented in the processing unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the storage device(s) 618, and the network interface 620 are coupled to the bus 624. Although illustrated as being coupled to the bus 624, the memory 630 may be coupled to the processor unit 602.

While the embodiments are described with reference to various implementations and exploitations, it will be understood that these embodiments are illustrative and that the scope of the inventive subject matter is not limited to them. In general, techniques for call management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
   detecting a call to a target phone;
   determining a source of the call;
   determining one or more patterns of talk time for calls between the source and the target phone, wherein the patterns indicate one or more call durations for the calls between the source and the target phone;
   determining an amount of talk time a battery in the target phone can sustain;
   determining that at least one of the call durations for the calls between the source and target phone is greater than the amount of talk time the battery in the target phone can sustain;
   sending the call to a voice mail associated with the target phone.

2. The method of claim 1, wherein determining the one or more patterns of talk time further comprises determining an average talk time between the target phone and the source.

3. The method of claim 1, further comprising determining an emergency overriding condition exists and alerting the target phone user of the incoming call.

4. One or more machine-readable media having stored therein a program product, which when executed a set of one or more processor units causes the set of one or more processor units to perform operations that comprise:
   detecting a call to a target phone;
   determining a source of the call;
   determining one or more patterns of talk time for calls between the source and the target phone, wherein the patterns indicate at least one talk time for the calls between the source and the target phone;
   checking a calendar associated with the target phone to determine when one or more calendar events occur;
   determining the at least one talk time for calls between the source and target phone interferes with the one or more calendar events associated with the target phone; and
   sending the call to a voice mail associated with the target phone.

5. The machine readable media of claim 4, further comprising alerting the user of the interference between the at least one talk time and the calendar event.

6. The machine readable media of claim 4, further comprising alerting the user that the talk time corresponds with the calendar event.

7. The machine readable media of claim 4, further comprising alerting a caller of the interference between the at least one talk time and the calendar event.

8. The machine readable media of claim 7, further comprising alerting the caller of the duration of the calendar event.

9. An apparatus comprising:
   a call criteria unit configured to store one or more call criteria, wherein each of the call criteria relate to a target phone and have a time limit;
   a call data unit configured to collect data regarding phone calls between the target phone and a source phone and determine a call pattern between the target phone and the source phone; and
   a call status unit configured to compare the call pattern with the one or more call criteria and determine a call status of the source call wherein the call status determines when an alternative action to completing the call is taken.

10. The apparatus of claim 9, further comprising a calendar unit configured to store one or more scheduled events the user of the target phone may attend.

11. The apparatus of claim 9, wherein the call criteria is a remaining battery life of the target phone.

12. The apparatus of claim 9, wherein the call criteria is a remaining minutes of a service plan.

13. The apparatus of claim 9, wherein the call criteria is a remaining minutes of a service level agreement.

14. The apparatus of claim 9, further comprising a GPS unit configured to determine the location and travel direction of the target phone.

* * * * *